United States Patent [19]

Schubert

[11] Patent Number: 4,912,727
[45] Date of Patent: Mar. 27, 1990

[54] DRAWER GUIDING SYSTEM WITH AUTOMATIC CLOSING AND OPENING MEANS

[75] Inventor: Wolfgang Schubert, Lustenau/Vlbg., Austria

[73] Assignee: Grass AG, Hochst/Blvg., Austria

[21] Appl. No.: 309,338

[22] Filed: Feb. 10, 1989

[30] Foreign Application Priority Data

Oct. 26, 1988 [DE] Fed. Rep. of Germany ....... 3836473

[51] Int. Cl.$^4$ ............................................. A47B 88/00
[52] U.S. Cl. ................................... 312/348; 310/90.5;
 248/206.5; 292/251.5
[58] Field of Search ............... 310/90.5; 312/319, 348;
 292/251.5, 341.11; 335/219, 285, 295; 188/161;
 220/230; 16/82; 160/DIG. 14; 248/206.5

[56] References Cited

U.S. PATENT DOCUMENTS

| | | | |
|---|---|---|---|
| 2,438,231 | 3/1948 | Schultz | 292/251.5 |
| 3,408,104 | 10/1968 | Raynes | 248/206.5 |
| 4,337,709 | 7/1982 | Nicholson | 248/206.5 |

*Primary Examiner*—James R. Brittain
*Assistant Examiner*—Gerald A. Anderson

[57] ABSTRACT

A drawer guiding system comprises a first rail for mounting in a furniture body, a second rail for mounting on a drawer and optionally an intermediate rail between the first and second rails, the rails being connected so as to be reciprocally slidable relative to one another. Pairs of magnetic components associated with respective adjacent rails assist or retard their relative displacement by mutual magnetic attration or repulsion. Each magnetic component is made up of individual magnets with differently aligned polarities, so that some attract corresponding magnets of an associated magnetic component and some repel. As the drawer approaches one end of its travel the overall mutual repulsion between the magnetic components of each pair becomes an attraction or vice-versa.

18 Claims, 3 Drawing Sheets

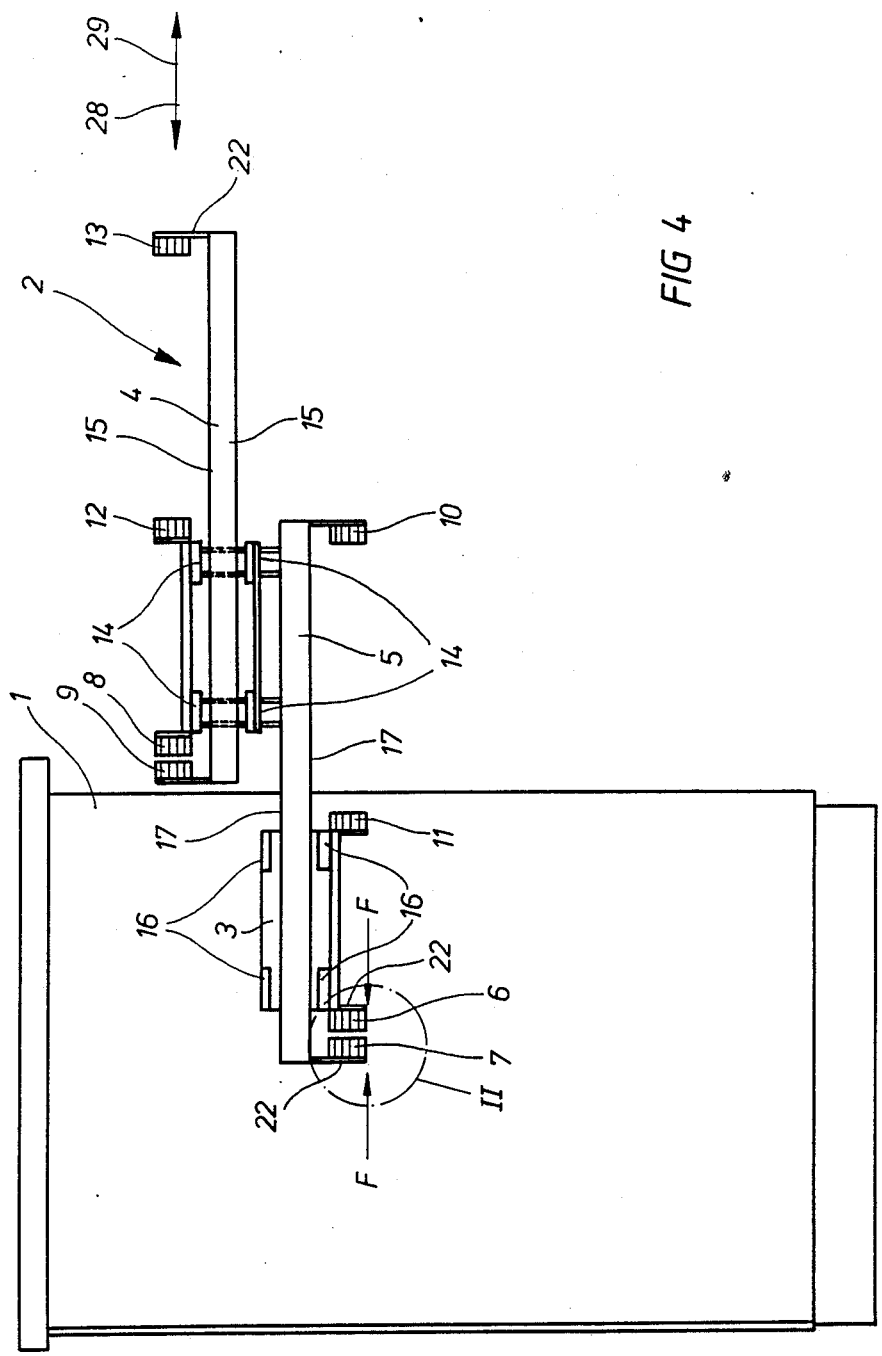

DRAWER GUIDING SYSTEM WITH AUTOMATIC CLOSING AND OPENING MEANS

BACKGROUND OF THE INVENTION

1. Field of the Invention

The invention relates to a drawer guiding system with automatic closing and opening means comprising a device arranged between two reciprocally displaceable parts of a drawer rail and/or a furniture mounting rail, which allows automatic closing and stopping and/or slowing of the drawer movement within the piece of furniture a short distance before reaching the closed position and which if appropriate also allows slowing down and/or stopping of pull-out displacement a short distance before reaching the full withdrawal length of the drawer.

2. Description of the Prior Art

In the case of single pulls or telescopic pulls for drawers which have been known hitherto it is known to provide slopes between the guiding rails at the furniture and drawer sides for the purpose of ensuring an automatic closure of the drawer at a short distance before reaching the closed position and conversely to ensure a damping action on the pull-out displacement from a short distance before reaching the withdrawn position. It is known that the drawer may also be locked to the piece of furniture in the pulled-out position. It is further known that the closing displacement may also be damped.

It has consequently been known before now to make use of a damping and locking action in the closed position as well as a damping and locking action in the open position.

Known devices of this type were based on mechanical locking principles only, until now. For example, that the guiding rollers of the guiding rail system may be allowed to roll along appropriate inclines to obtain the required locking actions at the positions described.

It is a disadvantage in the application of such inclines that the drawer is moved vertically relative to the furniture body and that the horizontal gap between the furniture front panel and the drawer front panel varies disadvantageously and unattractively.

Known mechanical damping systems of this type are inadequate moreover to fulfil the requirements applicable for damping heavy drawer loads and an increased handling effort is also required since a considerable resistance has to be overcome initially to pull the drawer up the incline from the inserted position.

The disadvantage arises furthermore of undesirable noise generation during the operation of these damping means and of comparatively high production costs involved in making the guide rails with the required slopes. Furthermore, the service life of the guiding rollers or rolling elements rolling along on the guide is limited.

SUMMARY OF THE INVENTION

It is accordingly an object of the invention to develop a limiting system for the opening and closing of a drawer of the aforementioned type such that additional machining or other working of the guiding rails and guiding rollers are no longer needed and the system as a whole may be operated more easily and noiselessly.

This object is achieved in accordance with the invention in that the device comprises a magnetic system including at least one pair of magnetic components, of which one component is arranged on the guiding rail and the other component is situated on a part of the drawer guiding system at which the reciprocal displacements of the guiding rail are to be damped and that each said component of the magnetic system comprises several magnets which are associated with one another, some having their poles aligned in one direction and the others with their poles aligned in the opposite direction.

The present invention includes not only single pull drawer guiding systems for which the only criterion is that a drawer rail insertible into and extractible from a piece of furniture should be damped and stopped if applicable at its two end positions, but also other types of drawer 10, guiding system i.e telescopic pulls and the like.

Reference is made to a particular embodiment of the invention in which the magnetic components are secured to the front and rear ends of a displaceable guiding rail (e.g. the drawer rail or the intermediate rail of a telescopic pull). 15 It is evident that optional intermediate positions of the displaceable guiding rail may also be made subject to damping and/or stopping and that just a single damping and/or stopping action on the displaceable guiding rail can be used at one of its positions, e.g..the extended position or 20, the closed position.

It is obvious moreover to one versed in the art that a kinetic reversal may be provided, meaning that the parts which are described in the following as being on the displaceable guiding rail may just as easily be secured on the 25 stationary guiding rail or on the piece of furniture itself.

In its broadest form therefore, the present invention merely consists in installing the magnetic systems referred to above between two parts of the drawer system which are displaceable with respect to each other.

It is of importance in this connection that front and rear magnetic systems be installed on the front and rear ends of the mounting or furniture rail relative to the longitudinal direction of the mounting rail, which engender a magnetic force in the direction of the longitudinal axis of the mounting rail and in the opposite direction thereto, that magnetic systems be installed on the drawer guiding rail which engender both attractive and repulsive forces in the longitudinal direction of the drawer rail, the magnetic systems situated at the rear extremity of the drawer guiding rail coming into contact with the magnetic systems situated at the rear extremity of the mounting rail in the fully open position and the magnetic systems situated at the front extremity of the drawer rail coming into contact with the magnetic systems situated at the front extremity of the furniture-side rail in the closed position and that the mutually associated magnetic systems of the furniture-side and drawer-side rails comprise a number of differently polarised permanent magnets, so that an attractive force initially prevails between the magnetic systems during contact between the mutually associated magnetic systems, with a repulsive force being engendered at a greater distance between the two mutually associated magnetic systems.

A completely new opening and closing delimitation is proposed in combination with a novel damping method, by means of the present invention. To simplify matters, the concept "magnetic system" will be used as a simplification for the system of permanent or electromagnets according to the invention, in the following description.

The operation of the device according to the invention will be described hereinafter with reference to a single pull system, in which connection it is self-evident that this damping method may be used as desired with conventional types of drawer guiding system, i.e. also in combination with telescopic pulls, pulls comprising slide guides, rolling elements, guiding rollers and the like.

According to the invention, each magnetic system comprises a plurality of permanent magnets which are installed in this magnetic system with differently aligned polarities.

This leads to a superimposition of different magnetic forces, in which connection it is preferred to have the permanent magnets polarised in such manner that attractive as well as repulsive magnetic forces are the result.

According to the invention, provision is now made in a first embodiment for the attractive forces of the mutually associated magnetic systems to be dominant during contact between two associated magnetic systems of the mounting rail and of the drawer rail.

After a particular gap is exceeded, i.e. after moving the two mutually associated magnetic systems apart, the repulsive forces come to predominate so that the two magnetic systems no longer attract but repel each other. This is accomplished according to the invention by superimposition of attractive and repulsive forces in the magnetic system described by layering and installation of differently aligned permanent magnets.

A completely novel operation of the opening and closing limitation is thereby established in the case of drawers, because the drawer must initially be pulled out of the piece of furniture by a few millimeters under a specific manual force to overcome the attractive force between the mutually associated magnetic systems.

Once the gap has reached a particular size, the repulsive force between the mutually associated magnetic systems is then dominant and the drawer travels out of the piece of furniture automatically without the application of additional manual force. The pull-out path travelled by the drawer automatically without the application of manual force, depends on the frictional conditions of the loadtransfer guiding rail system.

If use is made of a guiding system of a low-friction or almost frictionless type, such as is proposed within the scope of a magnetic guiding system, a very long automatic pull-out trajectory is obtained.

Magnetic systems of identical nature can be incorporated in an analogous manner for the purposes of pull-out limitation and of damping.

The repulsive forces are initially dominant when the magnet situated at the rear end of the guiding rail on the drawer comes close to the magnetic systems arranged at the rear end of the furniture mounted guiding rail, which causes a damping action on the pull-out displacement a short distance before reaching the fully open position.

It is only when this damping (repulsive forces) is counteracted by hand or when the drawer has acquired sufficient acceleration based on its weight to overcome this repulsive force, that the two mutually associated magnetic systems enter the range of reduced gap with at which the attractive forces then outweigh the repulsive forces and the two magnetic systems then attract one another, thereby arresting the drawer in its open position.

The gap resulting thereupon between the magnetic systems may be adjusted by appropriate mechanical setting devices, so that the cohesive force between the mutually attracting magnetic systems may be adjusted by these means.

An example of a telescopic pull providing a contact free intermediate rail acceleration, which also operates as an 30 automatic closing and opening system or as a closing and opening braking system, respectively, will also be described in the following.

The action described may be exploited in the case of full opening to cause contact-free and noiseless acceleration of the intermediate rail shortly before the drawer rail force of this magnetic combination is reached.

A dual braking action occurs prior to reaching an intermediate rail end stop, between the drawer rail and the intermediate rail as well as between the intermediate rail and the mounting rail. Some or all of the kinetic energy is intercepted and stored in this manner.

The magnetic lock between the drawer rail and the intermediate rail is initially neutralised by a minute pressure on the drawer facing panel upon closing the drawer. The now dominant repulsive force accelerates the drawer along a particular distance. At a short distance before reaching the terminal drawer rail stop, the intermediate rail is accelerated again in a contact-free manner. A dual braking action occurs again before the terminal stop of the intermediate rail is reached, between the drawer rail and the intermediate rail as well as 20 between the intermediate rail and the mounting rail. Some or all of the kinetic energy is again absorbed and stored in this manner. Upon opening the drawer, the magnetic lock between the drawer rail and the intermediate rail is initially overcome by a minute pull on the drawer facing 25 panel. The drawer is accelerated along a particular distance by means of the now predominant repulsive force (end of cycle).

It is a condition for this operation that the locking forces between the drawer rail and the intermediate rail be smaller than between the intermediate and mounting rails.

Other features and advantages of the invention will become apparent from the following detailed description when read in conjunction with the accompanying drawings which illustrate preferred embodiments of the invention.

BRIEF DESCRIPTION OF THE DRAWINGS

FIG. 4 shows a schematic cross-section through a telescopic pull drawer guiding system in accordance with a second embodiment in its fully extended position.

DETAILED DESCRIPTION OF THE PREFERRED EMBODIMENTS

Figure 1:
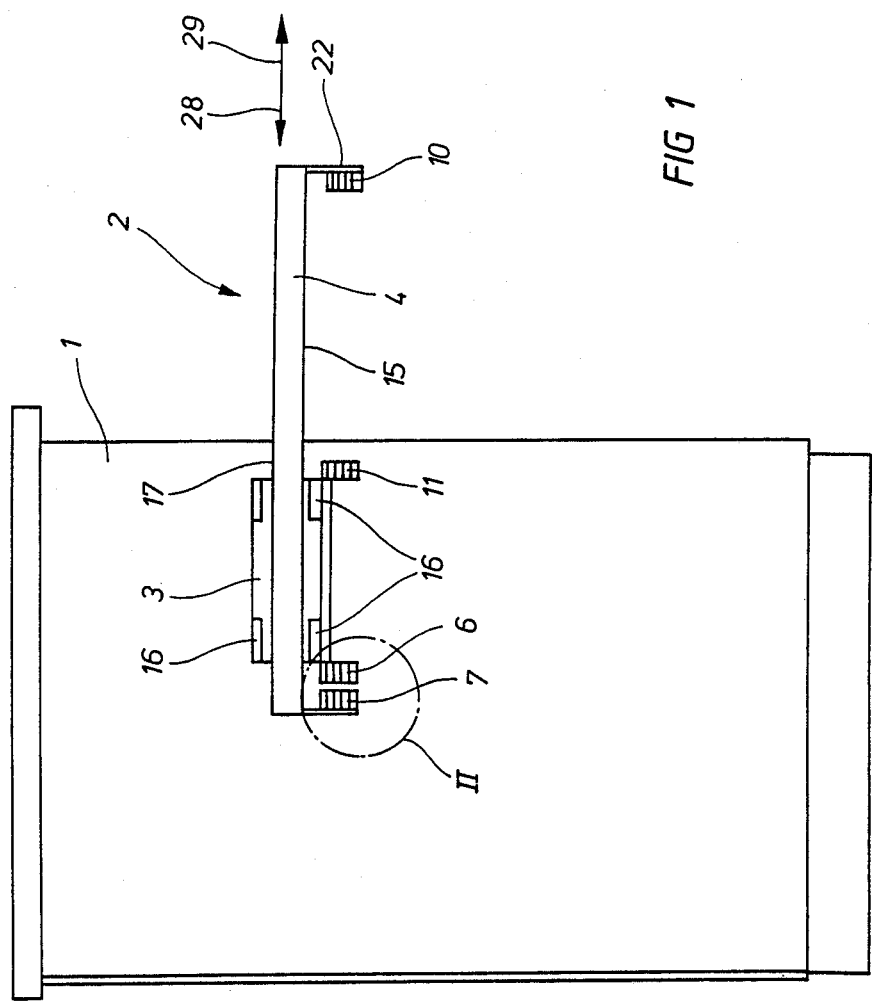
FIG. 1 shows a schematic cross-section through a single pull drawer guiding system in accordance with a first embodiment of the invention.

In both the illustrated embodiments a drawer 2 is mounted within a piece of furniture 1, for sliding displacement in the the directions shown by the arrows 28 and 29.

As stated in the foregoing, the choice of the loadtransfer guiding rail system and of the lateral guiding means is optional. No more than the limitation during the opening and closing displacements will be described in the following, within the scope of the present invention.

To this end, the drawer 2 has secured to each outer lateral side a drawer rail 4 which is displaceably located in a mounting or furniture rail 3.

The guiding system is constructed as a magnetic guiding system in this embodiment, magnetic bearings 16 being installed at the top and bottom in parallel with mutual spacing on the mounting rail 3, which are positioned opposite magnetic tracks 15,17 which are secured on the upper side of the drawer-mounted guiding rail 4.

FIG. 1 then depicts the situation in which the drawer rail 4 is pulled in the direction of the arrow 29 and is positioned at a short distance from reaching its fully pulled-out position.

To this end, a magnetic system 7 which has an analogous magnetic system 6 at the rear extremity of the furniture mounted guiding rail 3 aligned with it, is installed at the rear extremity of the drawer rail 4, to make provision for the extraction position.

Conversely, a magnetic system 11 which is associated with an analogous magnetic system 10 at the front end of the drawer-mounted guiding rail 4 is situated at the front end of the furniture-mounted guiding rail 3 to limit the closing displacement in the direction of the arrow 28.

The term "magnetic system" is intended in this context to denote a magnetic system of the type described in particular in the following with reference to FIGS. 2 and 3.

Figure 2:
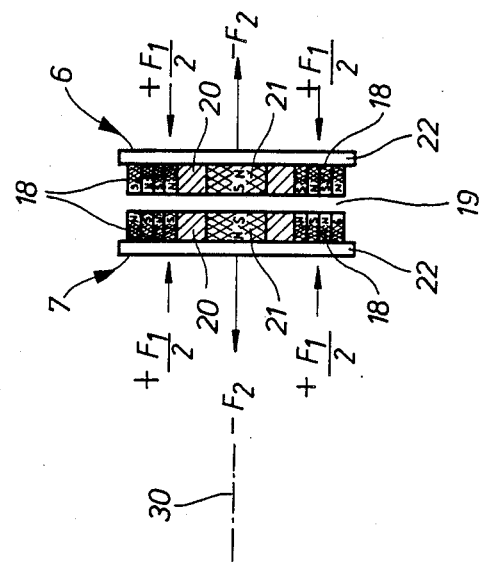
FIG. 2 shows a schematic cross-section through two mutually associated magnetic systems of the mounting-side and drawer-side guiding rails.

The magnetic system comprising the arrangement of magnets 6,7 according to FIG. 2 comprises a row of permanent magnets 18,21, the permanent magnets 18 each being formed by a set of alternately aligned individual magnets.

Such permanent magnets 18 are installed at the top and bottom with respect to the central longitudinal line of these magnetic systems 6,7, each of the individual magnets on each rail being aligned with its north or south pole facing a south or north pole respectively of a magnet on the other rail aligned with it to obtain an attractive force acting symmetrically with respect to the centre line 30.

The attractive force F1 is generated in the present embodiment, the permanent magnet system 18 at the top generating half the attractive force F1 and the bottom permanent system 18 generating the other half of the attractive force F1. This force F1 is plotted along the ordinate in the graph according to FIG. 3.

Mutually repelling permanent magnets 21 which are aligned with their south poles facing each other to generate the repulsive force F2 are situated in the middle of the magnetic systems 6,7. This force is also plotted along the ordinate in downward direction in the graph according to FIG. 3.

The gap 19 is present between the magnetic systems 6,7, the magnetic systems 6,7 being outwardly delimited by pole plates 22.

The drawer is then present at position 23 in the position shown according to FIG. 2, meaning that in this section of the graph the attractive force F1 overcomes the repulsive force F2 which is established by the mutually opposed permanent magnets 21.

The drawer 2 is thereby stopped in the piece of furniture 1 in its fully open position.

If the drawer is then pushed into the piece of furniture 1 by a small distance in the direction of the arrow 28, this increases the gap 19 between the mutually opposed magnetic systems 6,7.

Figure 3:
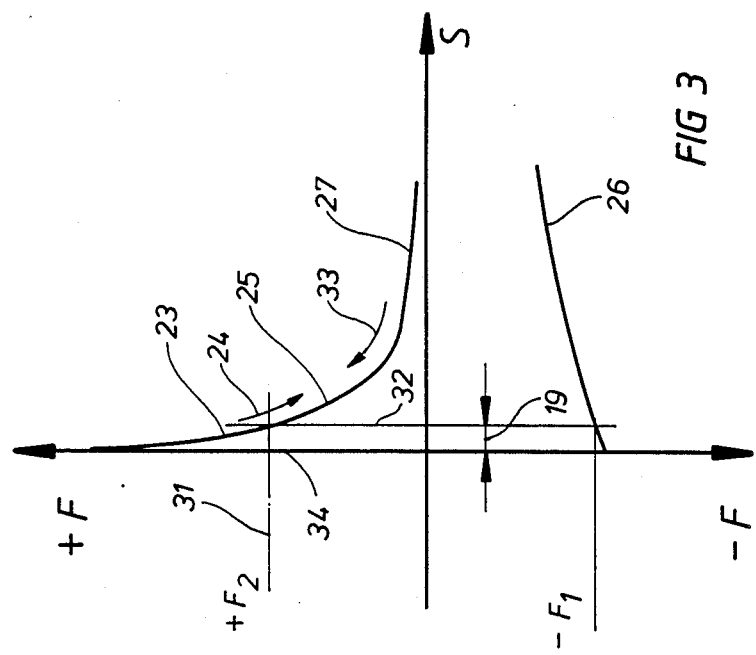
FIG. 3 shows characteristic curve of the travel of the magnetic system with respect to the magnetic force.

Starting from position 23 in the graph of FIG. 3, the attractive force F1 is then overcome in the direction of the arrow 24 and position 25 is reached on the lower graph section.

The repulsive force F2 is dominant at position 25 in this position as may be seen by subtracting the characteristic 26 of the repulsive force F2 from the characteristic 27 of the attractive force F1.

It is of importance in this connection that the characteristic 26 of the two mutually opposed permanent magnets 21 is shallower so that the repulsive force is predominant in this graph section starting at the point of intersection of the lines 31, 32.

. Under the action of the repulsive force, the magnetic systems 6,7 are then automatically moved apart in this area under the action of the repulsive force, whereby the drawer then moves automatically into the piece of furniture in the direction of the arrow 28 under the action of the repulsive force, the distance of automatic travel being a function of the frictional conditions of the guiding rail system.

The same action applies analogously shortly before the fully closed position is reached, the magnetic system 10 on the front end of the drawer rail 4 being associated with the magnetic system 11 on the furniture or mounting rail 3.

The same situation applies again in this case as that described with reference to FIG. 3, i.e. as soon as the magnetic systems 10,11 reach the confrontation setting, the repulsive forces are initially predominant, thereby securing a damping action on the inward displacement, after which the attractive force becomes dominant at the point of intersection of the lines 31,32 and the drawer is then held automatically in its closed position in the direction of the arrow 28.

It is particularly advantageous that a snap action is obtained by balancing or matching the two characteristics 26,27 subtracted one from the other, i.e. a progressively increasing damping action is obtained in the direction of the arrow 33 during traversal of the characteristic 27, which flips over suddenly at the point 34 at which an increasing attractive force is then obtained, which rises to the maximum value.

The conditions described in respect of a single pull also apply in analogous manner to the full telescopic withdrawal system illustrated in FIG. 4.

In this embodiment the drawer rail 4 is displaceably mounted on an intermediate rail 5 via magnetic bearings 14, magnetic tracks 15 being arranged on the drawer rail as in the embodiment of FIG. 1.

A magnetic system 9, which is associated with a magnetic system 8 at the rear end of the intermediate rail 5, is situated at the rear end of the drawer rail 4.

A magnetic system 12 associated with a magnetic system 13 at the front end of the drawer rail 4 is arranged in the same way at the front extremity.

Furthermore, a magnetic system 10 co-operating with a magnetic system 11 at the front end of the mounting rail 3 is arranged at the front end of the intermediate rail 5, whereas a magnetic system 7 which co-operates with a magnetic system 6 situated at the rear end of the mounting rail 3 is situated at the rear end of the intermediate rail 5.

The intermediate rail 5 is again displaceably guided in the mounting rail 3 via magnetic bearings 16, corresponding magnetic tracks 17 being installed on the top and bottom sides of the intermediate rail 5.

The same description as that given in relation to FIG. 1 applies in respect of the mutually associated magnetic systems so that only the operation of the full pull-out mechanism need now be briefly described.

A precisely defined pull-out displacement of the intermediate rail is now obtained by means of the described magnetic systems 6–13.

The closing displacement of the drawer 2 in the direction of the arrow 28 will now be described in detail in the following.

In this case, the magnetic systems 8,9 are initially in their attractive state i.e. the drawer is stopped thereby; the intermediate rail 5 is similarly arrested in its outermost position the magnetic systems 6,7.

As the drawer 2 is pushed in the direction of the arrow 28, the gaps between the magnetic systems 8,9 on the one hand and the magnetic systems 6,7 on the other hand are so adjusted that the magnetic systems 8,9 are separated first and the drawer is displaced on the intermediate rail 5 in the direction of the arrow 28, the intermediate rail 5 still remaining in its extracted position by cohesion between the magnetic systems 6,7.

As the magnetic system 13 approaches the system 12 in the direction of the arrow 28, a repulsive force is initially engendered between the two mutually associated magnetic systems 12,13 thereby overcoming the interlock (attractive force) between the magnetic systems 6,7 and separating these two magnetic systems.

The intermediate rail then precedes the drawer rail 4 without contact between their respective magnetic systems 10,11 reach mutually opposed positions, a repulsive force now initially and similarly being generated thereby. The repulsive force acts as a damping force a short distance before reaching the closed position and it is only by overcoming this repulsive force with an increasing approach between the two magnetic systems 11,12 that this repulsive force is overcome and the magnetic systems 10,11 attract one another, the intermediate rail thereby being locked in the piece of furniture.

At the same time or afterwards (depending on the setting of the gap or rather the magnitude of the repulsive and attractive force between the magnetic systems 12,13 and 10,11), the two magnetic systems 12,13 also reach a position of attraction, whereby the drawer rail 4 is automatically moved along a short distance on the intermediate rail 5 in the direction of closure under the action of the attractive force, and is immobilized thereafter. An analogous operation occurs between the intermediate rail 5 and the furniture rail 3. Both rails 4,5 are thereby immobilised in the piece of furniture.

A horizontal layer structure of the permanent magnets 18,21 has been illustrated in FIGS. 1 and 4.

It should also be noted in this connection that appropriate spacing battens 20 are provided to prevent harmful mutual influences between the permanent magnets 18 and 21. These spacing battens 20 may be replaced by gaps.

In the same way, the permanent magnets 18 mutually associated in groups need not necessarily be installed in the same magnetic systems 6,7 according to FIG. 2; these may also be arranged on these magnetic systems comparatively widely separated in space but firmly joined to these magnetic systems.

A horizontal layer structure of the permanent magnets 18,21 is illustrated in FIGS. 1,2 and 4.

In a modification of the present invention, the permanent magnets may instead be arranged in vertical layers i.e. the gaps 19 then do not extend in the vertical direction but horizontally.

Instead of the permanent magnets depicted herein, it is evidently possible moreover to replace these permanent magnets by electromagnets or to use a combination between electromagnets fixedly installed at the furniture side and movably installed permanent magnets.

In case of electromagnets being fixedly installed in the furniture body, provision is made in a modification of the invention for a load sensor to be used which detects the drawer load and the acceleration of the drawer and then automatically adjusts the damping action as a function of the acceleration by appropriate adjustment of the flow of current through the fixedly installed electromagnets.

In an analogous reversal with respect to the basic system shown in FIGS. 2 and 3, the following embodiment may also be provided as a damping device with a constant residual gap. This gap remains when the damping means is in its terminal position.

If in fact the positive ordinate +F is replaced by the negative ordinate −F in FIG. 3 whilst retaining the graphs illustrated, this yields a magnetic structure and a damping means which act in the opposite way to that of the damping means according to FIGS. 2 and 3.

During an approach between the two magnetic systems 6,7 starting from a comparatively large gap 19, the attractive force of the bottom characteristic 26 is dominant, so that the two magnetic systems 6,7 are drawn against each other rapidly under the action of this force, whilst traversing the top characteristic 27 in the direction of the arrow 33.

During the traversal of the characteristic 27 in the direction of the arrow 33 under simultaneous traversal of the characteristic 26 in the direction of the same arrow, the two magnetic systems 6,7 then approach one another under the action of an attractive force until the point 34 is reached at which the attractive force diminishes towards zero and changes over into a repulsive force beyond this point, say at the position 23.

This means that the two magnetic systems 6,7 approach one another up to a gap width 19 which does not drop below a specific size and the repulsive force is dominant if this gap width is reduced further, so that the two magnetic systems 6,7 come no closer to each other.

A contact-free damping device is thus produced in this case, because a "magnetic cushion" which prevents impingement between the two magnetic systems 6,7 always operates in the area of the gap 19.

What is claimed is:

1. A drawer mounting and guiding system comprising at least two guide rails connected to one another so as to be reciprocally slidable in a longitudinal direction relative to one another to carry a drawer into and out of a furniture body, and at least one pair of magnetic components, one of which is associated with one said guide rail and secured against movement relative thereto and the other of which is mounted on and movable with the other said guide rail, said magnetic components being so positioned and aligned as automatically to modify the relative movement between said guide rails at a selected part of said movement, each of said magnetic components comprising a plurality of magnets, some arranged to attract corresponding magnets of the other magnetic component and some arranged to repel corresponding magnets of said other magnetic component, whereby the magnetic components of said at least one pair exert a mutual attraction within a first mutual spacing range and a mutual repulsion within a second mutual spacing range.

2. A system as claimed in claim 1 wherein said magnetic components are positioned so as to modify the relative movement of said rails at one end of said movement.

3. A system as claimed in claim 1 comprising at least two of said pairs of magnetic components, positioned to modify said relative movement at both ends thereof.

4. A system as claimed in claim 1 wherein a first said rail is provided with means for securing it to a furniture body and a second said rail is slidably connected to the first and provided with means for securing it to a drawer.

5. A system as claimed in claim 1 comprising a first rail having means for securing it to a furniture body, a second rail having means for securing it to a drawer and an intermediate rail connecting said first and second rails and slidable relative to both.

6. A system as claimed in claim 5 wherein pairs of said magnetic components are provided to modify the relative movement between said first rail and said intermediate rail and between said intermediate rail and said second rail.

7. A system as claimed in claim 1 wherein at least one of said magnetic components, associated with a rail fixedly mounted in a furniture body, comprises a plurality of permanent magnets.

8. A system as claimed in claim 1 wherein at least one of said magnetic components, mounted on a movable rail, comprises a plurality of permanent magnets.

9. A system as claimed in claim 1 wherein at least one of said magnetic components comprises a plurality of electromagnets.

10. A system as claimed in claim 9 further comprising a load sensor to detect the load on a drawer carried by said system and to adjust the current supplied to said electromagnets in response to said detected load.

11. A system as claimed in claim 1 wherein several permanent magnets are so arranged and polarised in groups within said magnetic components that one group of permanent magnets exercises a force of attraction on a corresponding group of permanent magnets in the magnetic component opposite thereto and that another group of permanent magnets exercises a force of repulsion on another group of permanent magnets situated in the said opposite magnetic component.

12. A system as claimed in claim 11 wherein a terminal position damping action and co-ordinated terminal position stopping are established by virtue of the fact that as associated magnetic components approach one another, the repulsive force between the magnetic systems initially exceeds the attractive force and that as the gap between said magnetic components decreases to below a predetermined value the attractive force between them comes to exceed the repulsive force.

13. A system as claimed in claim 11 wherein an assistance to the displacement of the movable guiding rail at its terminal positions is established in combination with a contact-free terminal position damping action by the fact that as the associated magnetic components of at least one said pair approach one another it is the attractive force between said magnetic components which outweighs the repulsive force and that the repulsive force overcomes the attractive force when the gap between the magnetic components falls below a predetermined value.

14. A system as claimed in claim 1 wherein at least one said magnetic component comprises magnets which have one of their end faces at one end coupled together by a pole plate in a magnetically conductive manner.

15. A system as claimed in claim 1 wherein at least one said magnetic component comprises permanent magnets which have their major sides placed on and parallel to a magnetically conductive pole plate.

16. A system as claimed in claim 1 wherein at least one said magnetic component comprises permanent magnets installed in groups which are magnetically insulated one from another.

17. A system as claimed in claim 1 wherein at least one said magnetic component comprises permanent magnets arranged in groups, the magnets within at least one said group have their polarities aligned in different directions.

18. A system as claimed in claim 17, wherein the differently polarised permanent magnets of said group are magnetically insulated one from another.

* * * * *